Dec. 19, 1967     G. H. BLOUNT ET AL     3,358,945
ATTITUDE STABILIZING MEANS
Filed Sept. 21, 1964     3 Sheets-Sheet 1
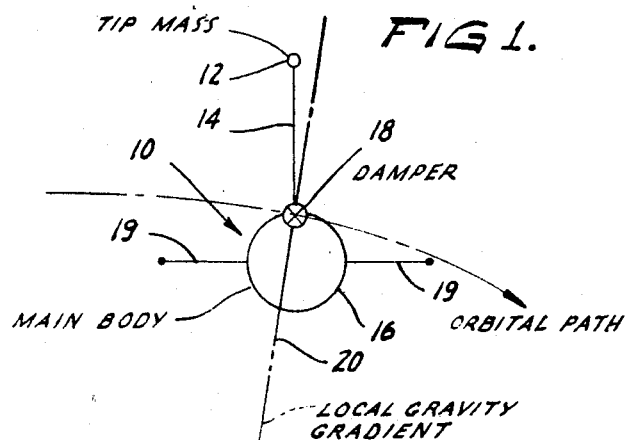
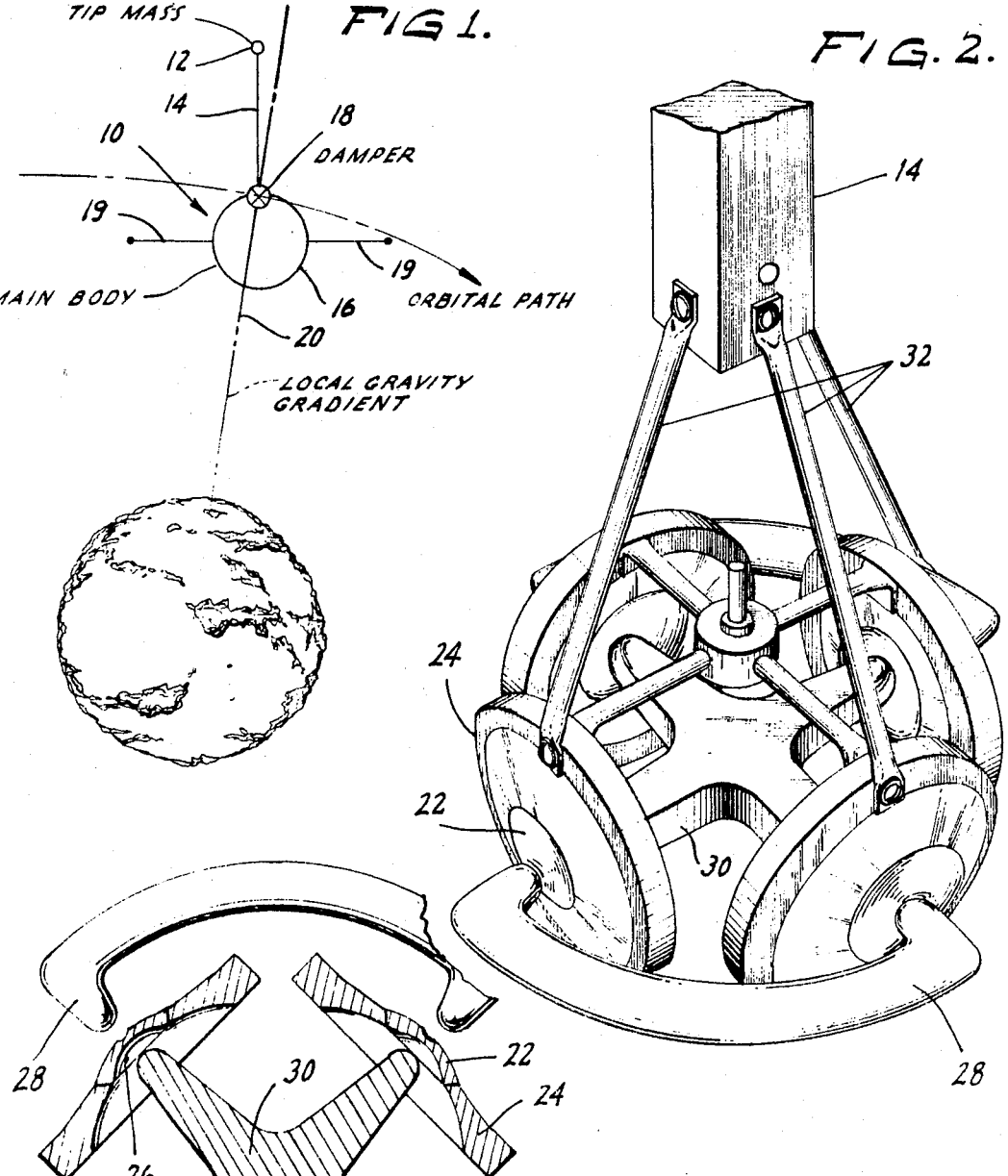
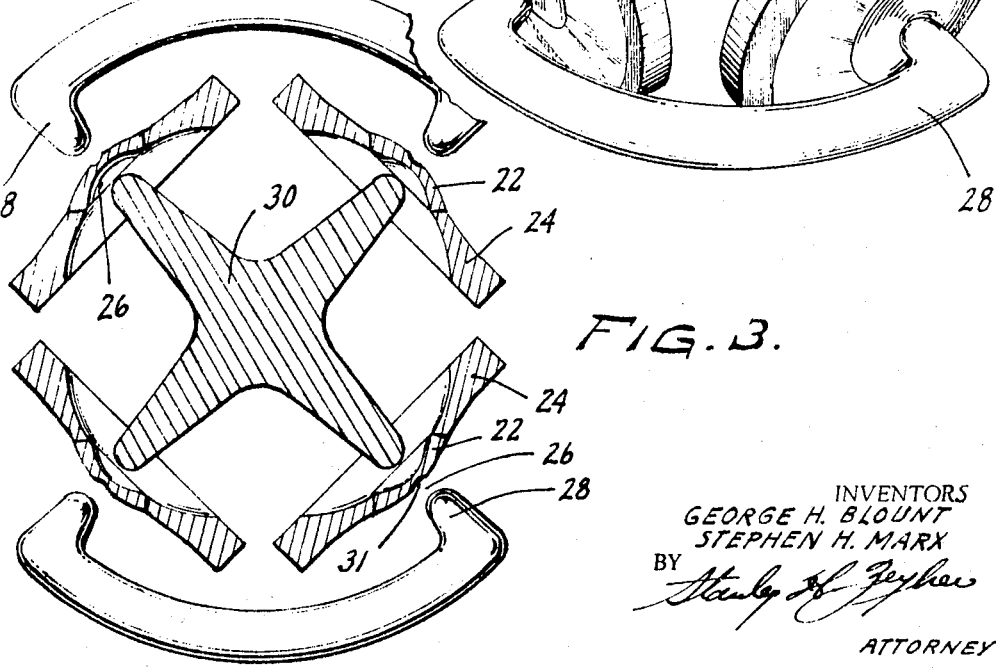
INVENTORS
GEORGE H. BLOUNT
STEPHEN H. MARX
BY
ATTORNEY Dec. 19, 1967   G. H. BLOUNT ET AL   3,358,945
ATTITUDE STABILIZING MEANS
Filed Sept. 21, 1964   3 Sheets-Sheet 2
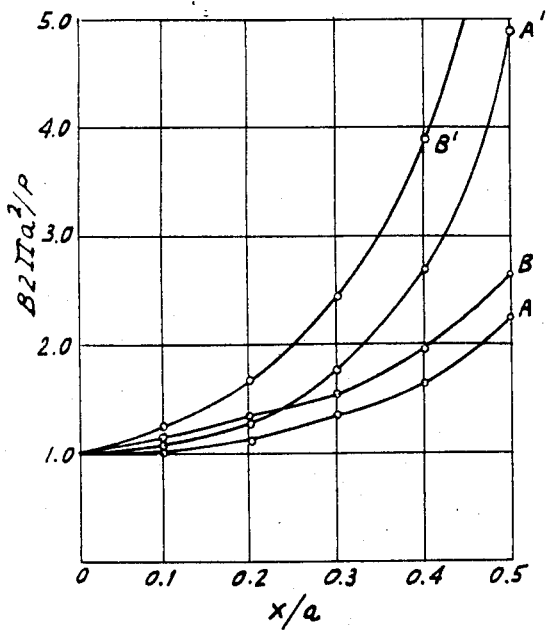
FIG. 5.
A — $B2\pi a^2/P$ FOR POINT SOURCE
B — $B2\pi a^2/P$ FOR MODIFIED SOURCE
A' — $B^2 4\pi^2 a^4/P^2$ FOR POINT SOURCE
B' — $B^2 4\pi^2 a^4/P^2$ FOR MODIFIED SOURCE
FIG. 4.
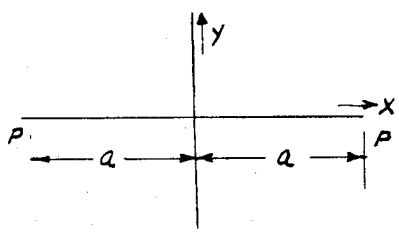
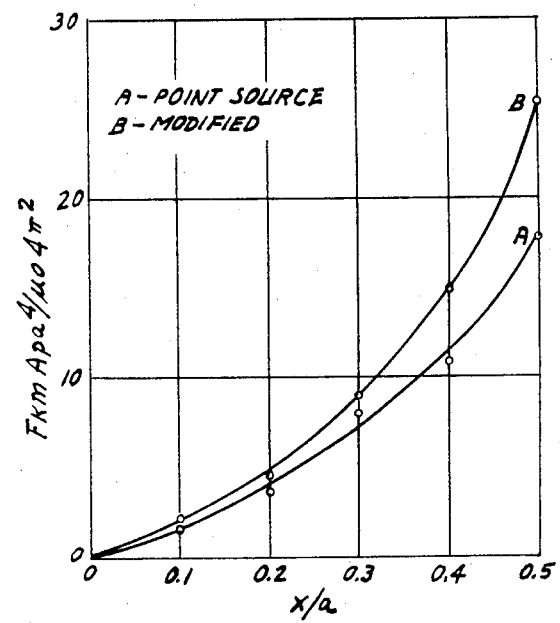
FIG. 6.
FIG. 7.
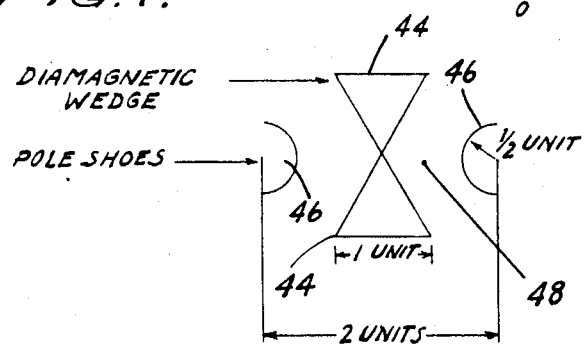
DIAMAGNETIC WEDGE
POLE SHOES
INVENTORS
GEORGE H. BLOUNT
STEPHEN H. MARX
BY
ATTORNEY Dec. 19, 1967 G. H. BLOUNT ET AL 3,358,945
ATTITUDE STABILIZING MEANS
Filed Sept. 21, 1964 3 Sheets-Sheet 3

INVENTORS
GEORGE H. BLOUNT
STEPHEN H. MARX
BY
ATTORNEY

United States Patent Office 3,358,945
Patented Dec. 19, 1967

3,358,945
ATTITUDE STABILIZING MEANS
George H. Blount, Redwood City, and Stephen H. Marx, Palo Alto, Calif., assignors to Philco-Ford Corporation, a corporation of Delaware
Filed Sept. 21, 1964, Ser. No. 398,010
14 Claims. (Cl. 244—1)

This invention relates to intermass coupling means and more particularly to improved attitude stabilizing mechanism for use with plural body spacecraft. In one aspect, the invention also contemplates a novel method of damping undesired librations in gravitationally stabilized plural body satellites.

While the invention will be illustrated and described in connection with gravitationally stabilized space vehicles of given configuration, it should be understood that such application is merely illustrative of one field of utility of the invention and not restrictive thereof.

With the increasing demand for earth-oriented satellites having extreme reliability and extended operational life there has developed a need for the replacement of active attitude control systems, using on-board power, by passive means utilizing natural forces.

One scheme which has been proposed for achieving passive attitude stabilization is that based on the interaction of the spacecraft with the gravitational force field in which it is immersed. It long has been established that gravitational forces will act on the mass elements of an elongate body to torque the longitudinal axis of the body into alignment with the local gravitational field. Because of inertial effects, this action is productive of a steady state pendulous libration consisting of simple harmonic motion about a position of stable equilibrium. Once excited, the libration will continue indefinitely unless some damping mechanism is present. To reduce the libration to acceptable limits and asymptotically to approach an orientation of stable equilibrium, requires the employment of some form of energy-dissipating device. Since the only way a space vehicle can dissipate the disturbance energy is by radiation, it is necessary, if librations are to be attenuated, to convert the perturbing energy to heat. In response to this need a number of passive damping systems have been attempted for plural body spacecraft using members interconnected by energy dissipative couplings and restoring springs, or by intercoupling two masses having different response frequencies to produce dynamic damping of the disturbance energy.

Space vehicle flight paths are subject to various perturbations which induce pendulous motion. The disturbances, in addition to those exerted on the spacecraft by external physical bodies, are assumed to be caused by variations in the gravity environment of the vehicle. Because of the nature of the perturbations the oscillation frequency of the orbiting spacecraft is related to the angular velocity of orbit. It has been computed, for example, that a satellite having an orbital period of 100 minutes experiences a natural libration period of approximately 50 minutes duration in both the plane of the orbit and in the plane perpendicular to the orbit. As the altitude of orbit increases the period of oscillation similarly increases. Analysis discloses that the amplitude of the spring constant which would be needed to achieve verticality of an orbiting spacecraft after its misalignment by gravitationally-induced perturbations would be of the order of between $10^{-4}$ and $10^{-6}$ ft.-lb./rad. for a satellite placed in orbit, for example, at an altitude of 5000 miles and that a damping coefficient of $10^{-4}$ ft.-lb./rad./sec. is necessary to dissipate the disturbance energy. Very long libration periods, when combined with the low order of damping required to attenuate the disturbance energy, make passive attitude stabilization a most difficult problem.

Translated into hardware these parameters would require the use of extremely small springs and dash pots, coupling large masses. The values are normally so disproportionate that it is impossible with customary techniques to maintain a suitable ratio of stiction to spring and viscous forces. Additionally, the coupling has to be free of coulomb friction to obtain an instantaneous threshold of response.

Accordingly, it is an object of this invention to provide attitude stabilizing means for use with plural body spacecraft which overcomes the difficulties and deficiencies of the prior art.

It is a further object of the invention to provide a stictionless, mass-coupling mechanism involving no active components which provides both support for the intercoupled masses and the restoring and damping forces necessary to achieve effective stabilization.

The apparatus of the invention basically consists of a stictionless coupling for articulately interconnecting two bodies. The couplings comprise a pair of independently pivotable members one of which includes means providing a magnetic field in which diamagnetic means carried by the other of said members is freely suspended in spaced adjacency to said first member. The coupling is such that the members assume a nominal or rest position relative to each other. Any disturbance causing relative movement between the members results in generation of a force which acts to restore the members to their original rest position.

The invention in its preferred form is featured by the provision of a lossy, stictionless, universal joint providing three degrees of rotational freedom. In this embodiment the motion which is produced by the disturbance energy and by the coupling's reaction to that disturbance is used to convert the energy into heat through magnetically induced losses.

The objects and advantages within contemplation will be readily understood by reference to the accompanying detailed description and drawings, in which:

FIGURE 1 is a schematic view of a gravitationally stabilized satellite embodying apparatus of the present invention;

FIGURE 2 is a perspective view showing constructional details of a universal coupling comprising a preferred embodiment of the invention;

FIGURE 3 is a sectional view of the coupling shown in FIGURE 2, taken along a medial cutting plane;

FIGURE 4 is a diagram of the coordinate system to which reference is had in the specification;

FIGURE 5 is a graph showing the variation in flux density at various positions within the magnetic field of the coupling;

FIGURE 6 is a graph showing the restoring force generated by the coupling as suspended diamagnetic material is displaced from its nominal or rest position between the pole shoes;

FIGURE 7 is a schematic showing of optimized dimensions of a coupling constructed in accordance with the teachings of the instant invention;

Figure 8:
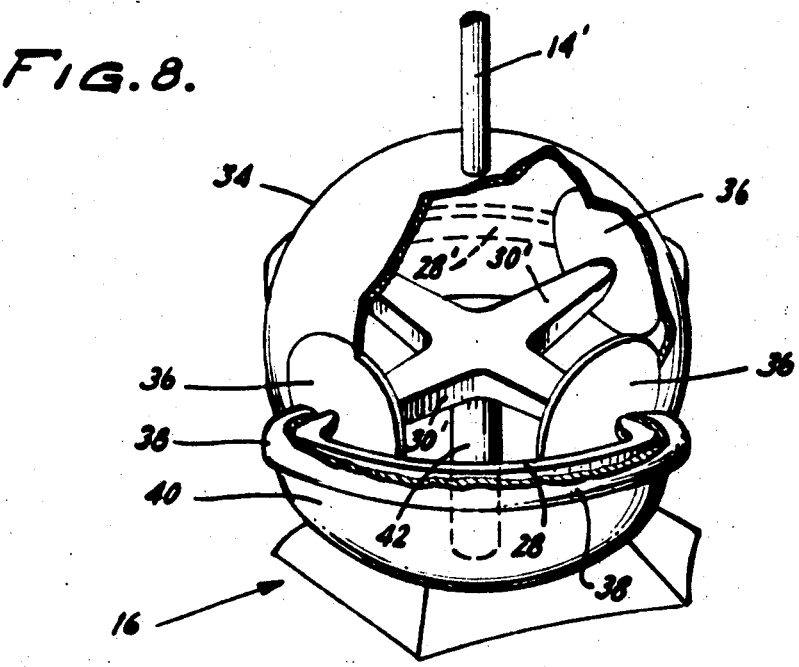
FIGURE 8 shows an arrangement for incorporating a coupling having three degrees of freedom in plural body spacecraft.

In applying the invention to a gravitationally stabilized, plural body spacecraft for the purpose of delimiting the amplitude of librational excursions in three degrees of freedom there is provided a universal coupling the independently movable members of which are connected to individual body portions of the spacecraft. Disturbance of the coupling's equilibrium position occasioned by relative movement between the spacecraft bodies results in generation of a force which acts to restore the members to their nominal position. The resulting movement of the parts is in turn used to translate an electrically conductive metal, carried by one of the members, through the coupling's magnetic field to induce losses within the conductive metal for the purpose of dissipating the disturbance energy.

Fundamental to the invention is the discovery that a stictionless universal coupling having force characteristics requisite to stabilize a two body satellite structure could be obtained by utilization if the force generated at a boundary between free space and a diamagnetic material when placed in a magnetic field. Such a coupling provides support without material contact. A diamagnetic material when placed in a magnetic field seeks an orientation which minimizes the magnetic flux within its volume. The forces of repulsion which are generated are used to provide both a bearing support and a spring-like force, the coupling being only through a magnetic field. It was found that paramagnetic or ferromagnetic materials are not suitable for this application since they provide "attractive" forces which cannot be passively balanced to provide a bearing. It was also discovered that dissipation of the libration-inducing energy can be provided by eddy current damping produced by translation of an electrically conductive diamagnetic material through an onboard created magnetic field.

Referring to FIGURE 1 of the drawing, the invention is shown embodied in a gravity-gradient stabilized, plural body spacecraft 10 comprised of a tip mass 12 carried on an extensible boom 14 coupled to the main body portion 16 of the satellite through a magnetic, hinge-damper mechanism 18. The main body of the vehicle is postulated as being spherical in shape with a diameter of approximately 24 inches, having a weight of 100±10 pounds and moments of inertia of 1.5 to 2.0 slug/ft.² The boom extension capability is assumed to be limited to about 40 feet and the orbital altitude to be of the order of 500 nautical miles. Laterally extending whips 19 are used both to despin the satellite after orbital injection and to improve attitude stability.

The damper mechanism 18 comprising a preferred embodiment of the invention consists essentially of a universal joint for coupling the two masses 12 and 16. As seen in FIGURE 1, the principal axes of the two-mass system are colinearly aligned in the nominal or rest position and tend toward dynamic stabilization about the local gravity vector 20.

The detailed construction of damper 18 is shown in FIGURE 2 and comprises a plurality of specially configured diamagnetic disc inserts 22 carried by disc plates 24, suspended in a magnetic field 26 (FIGURE 3) formed in the air gap between yoke-shaped pole pieces 28 and cross piece 30.

In the embodiment shown, the diamagnetic discs are connected rigidly to the boom 14 associated with the tip mass 12 by means of support structure 32. The magnetic elements 28 and 30 are carried by the main body 16 of the satellite.

One form of housing for incorporating the coupling 18 in plural body spacecraft is shown in FIGURE 8 and consists of a hemispherical dome-like structure 34 containing diamagnetic disc inserts 36. The size of the inserts has been greatly exaggerated to better illustrate the construction. The dome may be conveniently connected to one body of the satellite by means of structure 14'. The magnetic pole pieces of the damper are housed within recesses 38 provided in the main body structure 40. A pair of magnets are used to eliminate any net magnetic pole moment and to form a quadri pole. This construction also eliminates any interaction torque between the spacecraft and the earth's magnetic field. The cross piece 30' which provides a return path for the magnetic flux, is mounted on a standard 42 extending from the main body of the satellite.

In the construction shown in FIGURE 2, relative movement between the tip mass and main body of the satellite will manifest itself in misalignment of the members of the coupling producing an increase in the magnetic flux within the volume of the diamagnetic discs 22. This causes generation of a restoring force which realigns the tip mass and main body of the satellite. The movements of the discs 22 are used to translate an electrically conductive material which in the preferred embodiment is carried by the discs in the form of an overlay, through the magnetic field established by the pole pieces to generate eddy currents within the conductive material and dissipate the disturbance energy, as explained more fully in what follows. The shape and spacing of the slug or disc and pole pieces is such as to produce a linear restoring force in response to relative rotational movements of the elements of the coupling. The restoring force due to pure displacement, as opposed to rotational movement, depends partly on the inhomogenity of the field and is non-linear. As will be discussed in greater detail hereinafter, the required coupling configuration for torque linearity is that the pole pieces 28–30 be spherical in configuration at their tips and spaced by a distance equal to twice the radius of sphericity. It also has been determined that the diamagnetic slugs must be shaped so as to produce a linear increase in the volume which they present to the magnetic field as a result of their displacement from the nominal or rest position.

The linear increase in volume (which in a homogeneous field would produce a constant force) combines with the inhomogeneous field to produce a linear spring-like force. Experimentally it is found that a straight linear taper (FIGURE 3) of the thickness of a circular disc slug (warped to fit the spherical support) provides a very close approximation to the required shape. A saving in the necessary amount of diamagnetic material is effected by compensating for the finite thickness of the pole pieces. That is, by providing a small central zone 31 which has no taper. This zone should have a radius of about ½ to ¾ that of the pole pieces.

More (or fewer) slugs and magnets could be used to provide greater (or less) freedom of relative movements of the parts of the device. As shown, the device of FIGURE 2 provides three degrees of rotational freedom with linear restoring force. It also provides a linear spring-like force for displacement in the vertical sense only. The addition of one more magnetic set could be used to provide for three degrees of freedom in rectilinear displacement.

As previously noted the restoring force required to offset disturbance torques of the type encountered by gravitationally stabilized spacecraft is harmonic in nature. Analysis of the formula defining the force exerted on the boundary between the two materials having different magnetic permeabilities, when immersed in a magnetic field, discloses that the variables which can be manipulated to produce an harmonic or linear restoring force are the volume of the diamagnetic material and the strength and configuration of the field. The formula defining the relationship is set out below:

$$\overline{F}_v = \frac{\mu_o}{2} H^2 V K_m \qquad (1)$$

where:

$\overline{F}_v$ is the force per unit volume,
$\mu_o$ the permeability of free space,
H the magnetizing force,
V the differential operator, and
$K_m = X_m + 1$, where $X_m$ is the magnetic susceptibility.

Utilizing principles of this invention couplings having one, two or more degrees of freedom may be evolved.

To obtain a strictionless bearing a maximum flux density gradient between the pole shoes of the magnets is required. This yields a differential force in the direction of the field which tends to center the diamagnetic material in the air gap between the poles. To establish stable suspension of the material in the magnetic field in directions transverse the field the material was configured symmetrically. One such arrangement for a coupling, designed to have two degrees of freedom, is the idealized construction schematically shown in FIGURE 7.

The forces acting on the suspended element 44, referring to FIGURE 7, cancel if the following conditions are met, the element is symmetrically configured, centered between the pole shoes 46, and the field pattern established in the air gap 48 between the shoes is symmetrical.

To arrive at a coupling of the type shown in FIGURE 2, having three degrees of freedom, a field pattern, circular in cross-section, was investigated. As a first approximation the magnetic flux density along the X axis between two magnetic point sources was considered as given by the formula:

$$B_x = \frac{-p}{2\pi} \frac{(x^2+a^2)}{(x-a)^2(x+a)^2} \quad (2)$$

where:

$p$ is a point source and
$a$ is as defined in the coordinate system shown in FIGURE 4.

To determine the shape of the diamagnetic material which would yield the desired force characteristics when immersed in a circular field the force desired was assumed to be defined by the expression $dF/dY = K$. The force characteristic hence is given by the equation:

$$F = Ky = -\frac{\mu_0}{2} \int H^2 V K_m dV \quad (3)$$

The integration is taken over the volume of the slug.

Since the diamagnetic slug is assumed to be symmetrical about the axis of symmetry of the field, the vectorial expression for magnetic susceptibility $VK_m$ can be replaced by the expression $$\hat{j}\frac{\partial K_m}{\partial y}$$

Making this substitution, Equation 3 becomes:

$$F_y = K_y = -\frac{\mu_0}{2} A \int_0^{w(y)} \frac{\partial K_m}{\partial y} H^2 dx \quad (4)$$

where:

$A$ is the area over which the field acts and
$w(y)$ is the thickness of slug in direction of $x$.

The susceptibility, $K_m$ is isotropic and is not a function of the field.

Substituting Equation 2 in Equation 4:

$$F = Ky = -\frac{A}{\mu_0 4\pi^2} p \int_0^{w(y)} \frac{\partial K_m}{\partial y} \cdot \frac{(x^2+a^2)^2}{(x^2-a^2)^4} dx \quad (5)$$

$$\frac{Ky\mu_0 4\pi^2}{\chi_m A p} = \int_0^{w(y)} \frac{(x^2+a^2)^2}{(x^2-a^2)^4} dx \quad (6)$$

where $\chi_m$ is the expression for $\partial K_m/\partial y$ for abrupt change in $K_m$.

To provide a meaningful solution to this integral, a numerical integration was performed. The results of that integration are shown in FIGURES 5 and 6.

The forces obtained using a linear wedge of the form $w(y) = K_1 y + K_2$ are tabulated below. The tabulation also shows results for a modified point source obtained when spherical pole shoes made of a material having a permeability somewhat less than ideal (infinity) are used.

TABLE NUMBER 1

| | Point Source | | | Modified Point Source | | |
|---|---|---|---|---|---|---|
| $x/a$ | $\dfrac{B^2\pi a^3}{p}$ | $\dfrac{B^2 4\pi^2 a^4}{p^2}$ | $\dfrac{F\chi_m A p a^4}{\mu_0 4\pi^2}$ | $\dfrac{B^2\pi a^3}{p}$ | $\dfrac{B^2 4\pi^2 a^4}{p^2}$ | $\dfrac{F\chi_m A p a^4}{\mu_0 4\pi^2}$ |
| 0 | 1.0 | 1.0 | -------- | 1.00 | 1.00 | -------- |
| 0.1 | 1.03 | 1.6 | 2.0 | 1.12 | 1.25 | 2.2 |
| 0.2 | 1.13 | 1.275 | 4.0 | 1.30 | 1.69 | 5.0 |
| 0.3 | 1.318 | 1.755 | 8.0 | 1.57 | 2.46 | 9.9 |
| 0.4 | 1.645 | 2.70 | 11.0 | 1.98 | 3.90 | 15.0 |
| 0.5 | 2.22 | 4.95 | 18.5 | 2.68 | 7.20 | 25.5 |

It will be seen referring to FIGURE 6 that when a wedge shaped element is moved off center the force characteristic resembles a spring type restoring force. If a diamagnetic material is used the force generated is always one of repulsion. To obtain a point of equilibrium, as has previously been noted, it is required that the diamagnetic material be constructed in a symmetrical shape, such as shown in FIGURES 2 and 7. FIGURE 7 also shows optimized dimensions for one form of configuration. It was found that if four identical elements of conical configuration having the cross sectional shape shown in FIGURE 1 were positioned at spaced intervals around the perimeter of a sphere there resulted a coupling having two degrees of freedom. To obtain the desired eddy current damping, the diamagnetic slugs 44 were coated with a conductive material. One material found particularly advantageous for use in this application was copper which is slightly diamagnetic. Gold may also be used.

To determine the shape of the electrically conductive material necessary to produce a constant damping torque, reference should be had to Formula 7 set out below:

$$\frac{T}{\omega} = \frac{K_4 B^2 s L^4}{S^2 + \mu_0^2 L^2 \omega^2} \quad (7)$$

where:

$T$ = torque
$\omega$ = angular velocity
$K_4$ = constant
$B$ = flux density
$S$ = resistance
$L$ = path length Since the material is exposed to the variable field defined in Equation 2, neglecting the expression $\mu_0^2 L^2 \omega^2$ due to the low angular velocity for this application and letting $x = ay$ Equation 7 reduces to:

$$S = \frac{(y^2+L)^2}{K_5 a^4 (y^2-L)^4} \quad (8)$$

where:

$$K_5 = -\frac{Tp^2}{\omega K_4 4\pi^2}$$

Since $$S = \frac{L}{tbd}$$

where:

$b$ = width of conductor
$t$ = conductivity
$d$ = depth of conductor, and
$L/tb$ = constant $$d = \frac{K_5 a^4 (y^2-L)^4 tL}{b(y^2+L)^2} \quad (9)$$

From Formula 9 it was determined that to produce a constant damping torque the electrically conductive material should be shaped so that its thickness, i.e. resistance, varies approximately inversely as its distance from the center of the field.

Using the mathematically established criteria as bench marks of construction the coupling shown in FIGURE 2, was developed empirically.

The diamagnetic material to be used is somewhat optional although a high force-to-diamagnetic material mass is usually desired. Diamagnetic materials found to have the requisite characteristics for the specific application here under consideration were graphite, pyrolitic graphite and bismuth. One configuration for a lossy coupling designed to have a spring constant of $4 \times 10^{-4}$ ft.-lb./rad. (85.8 dyne cm./degree) and a damping coefficient of $1 \times 10^{-2}$ ft.-lb./rad./sec. (214.5 dyne cm./degree/sec.) consisted of bismuth discs 22 shaped in the form illustrated in FIGURE 2 and having the cross sectional configuration shown in FIGURE 9, cast in a copper mold having a thickness tailored to produce the required damping coefficient. The dimensional details of the configuration shown in FIGURE 9 are set out in Table 2, below.

TABLE NUMBER 2

| Angle From Center | Radius | Point |
|---|---|---|
| 0° | 3.010" | O |
| 0° | 2.990" | O' |
| 1° | 3.010" | A |
| 1° | 2.990" | A' |
| 5° | 3.034" | B |
| 5° | 2.966" | B' |
| 10° | 3.064" | C |
| 10° | 2.936" | C' |
| 15° | 3.094" | D |
| 15° | 2.906" | D' |
| 20° | 3.124" | E |
| 20° | 2.876" | E' |
| 25° | 3.154" | F |
| 25° | 2.846" | F' |
| 30° | 3.184" | G |
| 30° | 2.816" | G' |
| 35° | 3.214" | H |
| 35° | 2.786" | H' |

Figure 9:
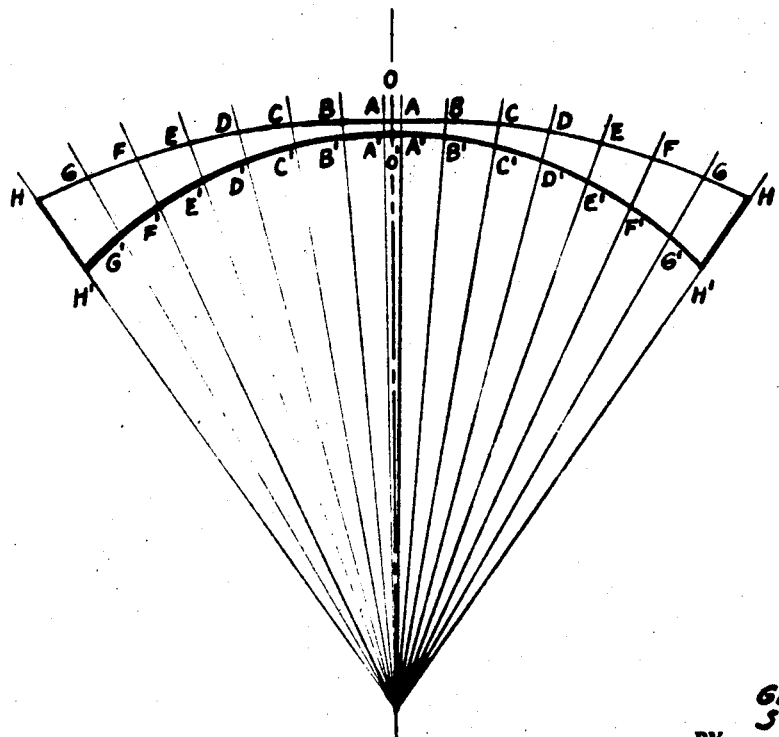
FIGURE 9 shows a cross sectional development of the area of a diamagnetic element of the universal coupling shown in FIGURE 2.

As seen in FIGURES 2 and 9 the wedges are shaped in the form of a section of a sphere and have a linearly decreasing cross section as the center of the disc is approached. The wedges were arrayed to simulate sections of a 3" radius sphere.

To provide the requisite restoring force and damping coefficient two Alnico V magnets 28 producing a flux density at the center of the gap of 1600 gauss were used. Under optimum conditions a unit constructed as shown in FIGURE 2, using bismuth discs 22 sheathed in copper, has a weight of 5.54 lbs. The same configuration using pyrolitic graphite will weigh about 3.6 lbs. If the discs are constructed of graphite, the copper overlay may be secured to the disc by use of a silicone cement able to withstand an ambient temperature range of over 100° F.

To protect the coupling during handling and launch, the coupling may be immobilized by encapulating the space between the magnets, the diamagnetic disc and return path, with a sublimating material such, for example, as biphenyl. After injection of the satellite into orbit the biphenyl sublimes rendering the coupling operational. In outer space this segment floats with its 0° center line coincident with the center line of the magnetic field. The symmetry of the diamagnetic slug results in the generation of vertical as well as horizontal restoring forces on movement of the disc from its equilibrium position. The shape of the field structure, with the associated high flux density gradient, gives a centering action to provide a lossy joint having three degrees of freedom. As noted above, by varying the number of slugs and magnets a coupling having greater, or less, flexibility may be constructed.

The spring constant equivalent of the system can be varied by changing the cross-sectional shape of the diamagnetic slug. This can be extended to include negative spring constants by having the thickest section of the discs at their centers. The damping coefficient also can be readily varied by changing the resistance of the conductor. In some applications where both spring constant and damping coefficients are to be adjusted, the flux density may also be used as a variable of manipulation.

From the foregoing description it will be appreciated that the instant invention provides a light weight stictionless attitude control mechanism having extreme reliability and unlimited operational life using purely passive means.

While a preferred form of the present invention has been depicted and described, it will be understood by those skilled in the art that the invention is susceptible of changes and modifications without departing from the essential concepts thereof, and that such changes and modifications are contemplated as come within the terms of the appended claims.

We claim:

1. An articulate stictionless coupling for interconnecting and maintaining two bodies in predetermined orientation, comprising means associated with one of said bodies providing a magnetic field, and diamagnetic means magnetically suspended in said field and associated with the other of said bodies.

2. In combination with a plural body satellite, attitude control mechanism comprising: means associated with one of the bodies of said plural body satellite establishing a magnetic field, and diamagnetic means magnetically suspended in said field and connected to and determinative of the orientation of another of said bodies of said plural body satellite.

3. In combination with plural body spacecraft, damping mechanism comprising: on-board means associated with a first of said bodies for establishing a magnetic field; diamagnetic means magnetically suspendable in said field associated with and capable of determining the rest orientation of a second of said bodies relative to said first of said bodies when said spacecraft is in orbital flight; and electrically conductive means arranged for movement relative to said field on displacement of said bodies from their rest orientation during orbital flight and effective to dissipate the displacement-inducing energy through losses generated in said conductive means as a result of its interaction with said field.

4. In a plural body satellite, stictionless linkage interconnecting two of said bodies in predetermined equilibrium orientation comprising: means associated with one of said bodies providing a magnetic field, and diamagnetic means associated with the other of said two bodies suspended in said field in spaced adjacency relative to said first-mentioned means and in such reactive relation to said field that disturbance of said equilibrium orientation results in a magnetically induced force which acts directly to restore said bodies to their equilibrium orientation.

5. In a plural body satellite, damping mechanism comprising: means associated with one of said bodies providing a magnetic field; diamagnetic means suspended in said field in a position of stable equilibrium, in spaced adjacency relative to said first-recited means, and rigidly secured to another of said bodies, said diamagnetic means being in such reactive relation to said field that displacement thereof from said stable position results in a magnetically-induced force effective to restore said diamagnetic means to said stable orientation; and electrically conductive means adapted for translation relative to said field on displacement of said diamagnetic means from its stable position, and effective through its interaction with said field to generate in said conductive means magnetically-induced losses of a magnitude sufficient substantially to dissipate the displacement-inducing energy.

6. A stictionless coupling for interconnecting bodies of a plural body satellite, comprising relatively movable members a first one of which is associated with one of said bodies and includes means providing a magnetic field, and the second of which is rigidly secured to a second of said bodies and includes diamagnetic material suspended in said field in spaced adjacency to said means.

7. Damping mechanism for attitude control of a plural body satellite, comprising a two member articulate coupling the first member of which is associated with a first one of said bodies and includes means providing a magnetic field, and the second member of which is associated with a second one of said bodies and includes diamagnetic means suspended in said field in spaced adjacency to said first recited means and in predetermined equilibrium relation to said first member, and electrically conductive means adapted for movement through said field by said diamagnetic means on disturbance of said equilibrium relation.

8. In a plural body satellite, stictionless linkage magnetically interconnecting two of said bodies comprising means rigidly secured to one of said bodies providing a magnetic field, and diamagnetic means rigidly secured to the other of said two bodies, suspended in said field in spaced adjacency relative to said first-mentioned means and in such reactive relation to said field that displacement of one of said bodies relative to the other results in a magnetically-induced restorative force proportional to the displacement.

9. In plural body spacecraft, attitude control mechanism comprising means rigidly secured to a first one of said bodies providing a magnettic field; diamagnetic means rigidly secured to a second one of said bodies suspended in said field in spaced adjacency relative to said first-mentioned means and in such reactive relation to said field that relative displacement of said bodies results in a magnetically induced restorative force proportional to the displacement; and electrically conductive means adapted for transport by said diamagnetic means through said field on relative movement between said bodies, and interactable with said field to generate losses therein of a magnitude sufficient substantially to dissipate the displacement-inducing energy.

10. Damping mechanism for use with gravitationally stabilized, plural body spacecraft, comprising: means constructed for association with one of said bodies providing a magnetic field; and electrically conductive diamagnetic means constructed for association with another of said bodies disposed in spaced adjacency to said first recited means, and in such reactive relation to said field that displacement of said diamagnetic means relative to said field results in generation of a force restorative of the initial position of said diamagnetic means in said field and effective, on movement thereof relative to said field, to dissipate the displacement-inducing energy through eddy current losses generated in said conductive diamagnetic means as a result of said movement.

11. Mechanism for damping libratory oscillation in a plural body satellite, comprising: a lossy magnetic coupling articulately interconnecting two of said bodies and including magnetic circuit means rigidly secured to one of said bodies providing air gaps of high flux density; diamagnetic elements rigidly secured to the other of said two bodies each said element being suspended in a corresponding one of said air gaps and providing, through its interaction with the flux in said air gap, the sole agency linking said two bodies, said diamagnetic elements being configured both to achieve a position of stable equilibrium in said air gap and to produce on displacement thereof from said equilibrium position by relative librational movements of said bodies a force capable of restoring said bodies to their equilibrium position; and electrically conductive means carried by individual ones of said diamagnetic elements and effective on displacement thereof relative to said air gap to dissipate the displacement-inducing energy through eddy current losses.

12. Mechanism for damping libratory oscillation in a plural body satellite, comprising: a lossy magnetic coupling articulately intercoupling two of said bodies and including bar magnet means and associated structure providing a flux return path, said means and structure being mechanically secured to one of said two bodies and forming a plurality of air gaps of high flux density; a plurality of diamagnetic elements mechanically secured to the other of said two bodies, each said element being suspended in a corresponding one of said air gaps and providing, through interaction with the magnetic field associated with said air gap, linkage intercoupling said bodies, said elements being configured to achieve a position of stable equilibrium within said air gap and to effect, on displacement thereof from said equilibrium position by relative librational movements of said bodies, a force restorative of said equilibrium position; and electrically conductive means carried by individual ones of said diamagnetic elements and effective on displacement thereof from said equilibrium position to dissipate the displacement-inducing energy by eddy current losses generated in said conductive means.

13. Mechanism for damping librational oscillation in a plural body satellite, comprising: a lossy magnetic coupling articulately interconnecting two of said bodies and including a pair of bar magnets and an associated cross piece providing a flux return path, said means and structure being mechanically secured to one of said two bodies and forming a plurality of air gaps of high flux density disposed in opposed pairs; a plurality of electrically conductive, diamagnetic disc-like elements mechanically secured to the other of said two bodies, each said element being suspended in a corresponding one of said air gaps and providing, through interaction with the magnetic field associated with said air gap, the linkage interconnecting said bodies, said elements being configured to achieve a position of stable equilibrium within the air gaps and to effect, on displacement thereof from said equilibrium position by relative librational movements of said bodies, both a force restorative of said equilibrium position and eddy current losses dissipative of the displacement-inducing energy.

14. Mechanism for damping libratory oscillation in a plural body satellite, comprising: a lossy magnetic coupling articulately intercoupling two of said bodies and including a pair of bar magnets and associated structure providing flux return paths, said means and structure being mechanically secured to one of said two bodies and forming a plurality of air gaps of high flux density disposed in opposed pairs; a plurality of diamagnetic disc-like elements mechanically secured to the other of said two bodies, each said element being suspended in a corresponding one of said air gaps and providing, through interaction with the magnetic field associated with said air gap, the linkage intercoupling said bodies, said elements being configured to achieve a position of stable equilibrium within the air gaps and to effect, on displacement thereof from said equilibrium position by relative librational movements of said bodies, a force restorative of said equilibrium position; and an electrically conductive overlay disposed on surface portions of individual ones of said elements and effective, on displacement of said elements from said equilibrium position, to dissipate the displacement-inducing energy through eddy current losses generated in said overlay.

References Cited

UNITED STATES PATENTS

| | | | |
|---|---|---|---|
| 3,017,777 | 1/1962 | Haeussermann | 244—1 |
| 3,031,154 | 4/1962 | Roberson et al. | 244—1 |
| 3,105,657 | 10/1963 | Mueller et al. | 244—1 |

FERGUS S. MIDDLETON, *Primary Examiner.*